(12) United States Patent
Schmitz, Sr.

(10) Patent No.: US 7,390,233 B2
(45) Date of Patent: Jun. 24, 2008

(54) STATION KEEPING MANEUVERABLE ARTICULATING AUTONOMOUS REGENERATIVE TACTICAL (SMAART) BUOY

(75) Inventor: Steven J. Schmitz, Sr., Sunnyvale, CA (US)

(73) Assignee: Lockheed Martin Corporation, Manassas, VA (US)

( * ) Notice: Subject to any disclaimer, the term of this patent is extended or adjusted under 35 U.S.C. 154(b) by 0 days.

(21) Appl. No.: 11/371,542

(22) Filed: Mar. 9, 2006

(65) Prior Publication Data

US 2007/0212956 A1    Sep. 13, 2007

(51) Int. Cl.
*B63B 22/00* (2006.01)

(52) U.S. Cl. ................ 441/1; 367/4; 441/6; 441/33

(58) Field of Classification Search ........ 441/1, 441/6, 7, 21, 22, 32, 33; 367/3, 4, 153
See application file for complete search history.

(56) References Cited

U.S. PATENT DOCUMENTS

| | | | | |
|---|---|---|---|---|
| 3,281,765 A | * | 10/1966 | Taplin | 367/4 |
| 3,290,642 A | * | 12/1966 | Mason et al. | 441/33 |
| 4,590,590 A | * | 5/1986 | Toone et al. | 367/4 |
| 4,777,627 A | * | 10/1988 | Congdon | 367/3 |
| 5,073,136 A | * | 12/1991 | DeWitt et al. | 441/7 |

* cited by examiner

*Primary Examiner*—Lars A Olson
(74) *Attorney, Agent, or Firm*—Fogg & Powers, LLC

(57) ABSTRACT

An articulating sonobuoy is provided. The articulating sonobuoy comprises a plurality of section, and a plurality of joints connecting each of the plurality of section to adjacent sections, wherein each of the plurality of sections self-aligns by rotating about one or more of said plurality of joints changing the shape of the buoy from a stowed configuration to a streamlined deployed configuration.

18 Claims, 3 Drawing Sheets

STATION KEEPING MANEUVERABLE ARTICULATING AUTONOMOUS REGENERATIVE TACTICAL (SMAART) BUOY

TECHNICAL FIELD

The present invention generally relates to buoys and, in particular, to station keeping sonobuoys.

BACKGROUND

Sonobuoys are equipped with electronic sensors to both gather data and transmit that data. Sonobuoys have been used to detect and locate submerged submarines. They have also been used in military and private applications to take measurements regarding the environment such as water temperature, current flow, etc. Sonobuoys can be free-floating, anchored or station-keeping. For more useful collection of data, it is desirable for the sonobuoys to be either anchored or station-keeping in order to collect data from relatively the same location. Station-keeping buoys are preferred in situations where an extended anchor would not be desirable or practical.

Station-keeping buoys, however, consume power quickly through the propulsion system used to keep the buoy in the same geographic location. This rapid power consumption prevents the station-keeping buoy from operating for extended periods of time. Additionally, sonobuoys used by the Navy are often launched through a small tube (i.e. typically a tube with an 8 inch diameter). The typical shape of the sonobuoys is, accordingly, cylindrical. Any deployable sonobuoys must, therefore, conserve this cylindrical shape in order to be launched from existing tubes.

For the reasons stated above, and for other reasons stated below which will become apparent to those skilled in the art upon reading and understanding the present specification, there is a need in the art for a deployable station-keeping buoy which can be launched from existing launch tubes and which significantly reduces power consumption allowing the buoy to operate for extended periods of time.

SUMMARY

The above-mentioned problems and other problems are resolved by the present invention and will be understood by reading and studying the following specification In one embodiment, an articulating sonobuoy is provided. The articulating sonobuoy comprises a plurality of section, and a plurality of joints connecting each of the plurality of section to adjacent sections, wherein each of the plurality of sections self-aligns by rotating about one or more of said plurality of joints changing the shape of the buoy from a stowed configuration to a streamlined deployed configuration.

In another embodiment, an articulating sonobuoy is provided. The articulating sonobuoy comprises a plurality of section, joint means for connecting said plurality of sections to adjacent sections, and folding means for folding said plurality of sections about said joint means such that the buoy has at least two configurations, wherein the at least two configurations include an initial stowed configuration and a deployed configuration.

In yet another embodiment, an articulating sonobuoy is provided. The articulating sonobuoy comprises a plurality of sections, each section being a cross-sectional piece of a streamlined airfoil shape, and a plurality of joints connecting each of the plurality of sections to adjacent sections, wherein rotation of each of the plurality of sections about the plurality of joints changes the shape of the buoy from a cylindrical stowed configuration with a diameter between approximately 6 inches and 21 inches to a streamlined airfoil deployed configuration.

In another embodiment, a method of deploying a streamlined sonobuoy through cylindrical launch tubes is provided. The method comprises aligning a plurality of sections to fit within a cylindrical launch tube, wherein each of the plurality of sections is a cross-sectional piece of a streamline shape, releasing the aligned plurality of sections through the cylindrical launch tube, and rotating each of the plurality of sections about one or more joints, wherein rotation of the plurality of sections aligns the plurality of sections to form a streamlined shape.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
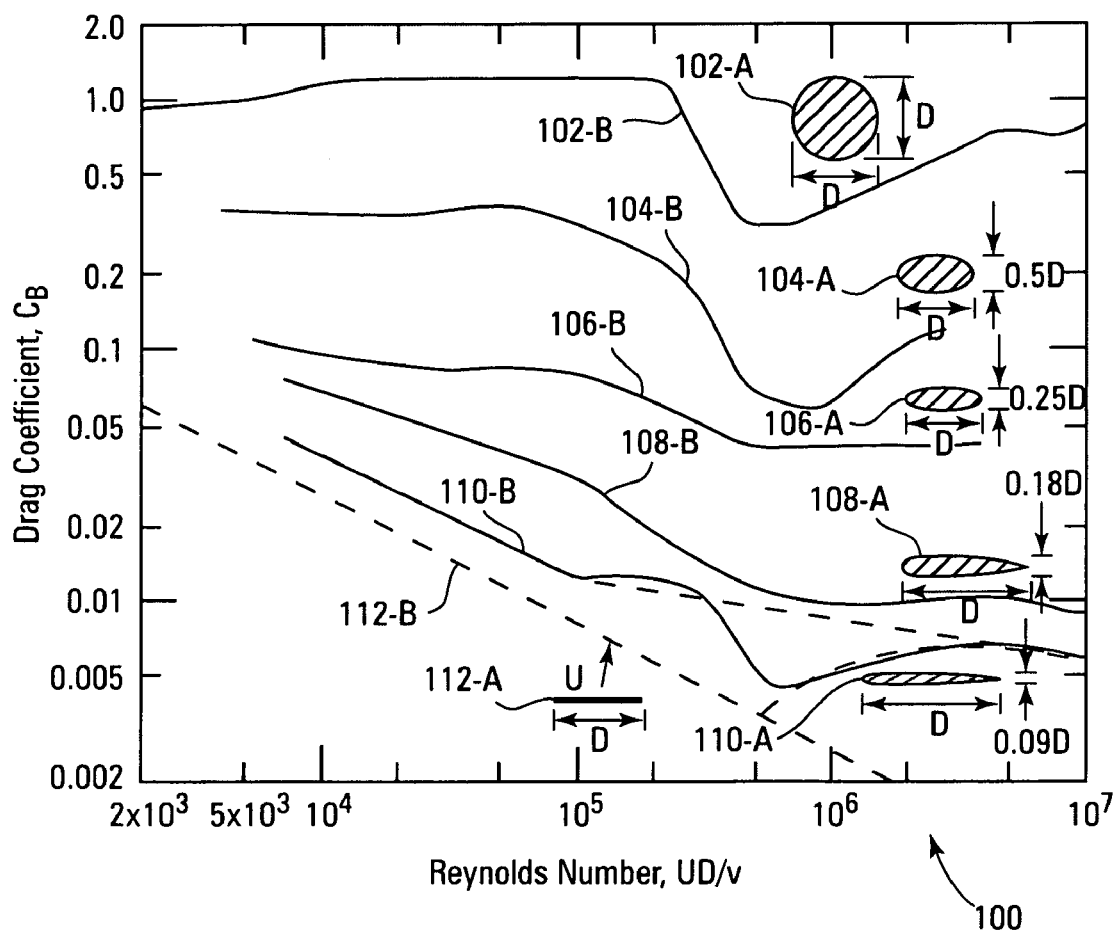
FIG. 1 is a graph of drag coefficients of common shapes as a function of Reynold's number.

FIG. 1 is a graph of drag coefficients of common shapes as a function of Reynold's number. The typical shape of buoys and launch tubes in use is circular. The diameter of these launch tubes ranges from 6 inches to 8 inches. The circular shape presents problems for station-keeping buoys. In order for station-keeping buoys to maintain their station or geographic location for extended periods of time, the buoys need either, more stored energy onboard, a more sufficient power supply system to power a motor and navigation system, a more efficient shape or all of the aforementioned. Embodiments of the present invention address the issue of providing a more efficient shape.

As shown in FIG. 1, circle 102-A, the typical shape of buoys, has a high drag coefficient. Due to that high coefficient, a large portion of power is lost through drag. Additionally, as FIG. 1 shows, other shapes have significantly lower drag coefficients and hence would be more efficient and lose less power due to drag. Each shape 102-A, 104-A . . . 112-A is associated with a graph 102-B, 104-B . . . 112-B representative of drag coefficient as a function of Reynold's number, respectively. For example, circle 102-A is associated with graph line 102-B while ellipse 104-A is associated with graph line 104-B. Additionally, the length and width dimensions for each shape are shown in FIG. 1 as a multiple of length D. For example, circle 102-A has length D and width D while ellipse 104-A has length D and width 0.5D or ½ the length of D.

Of the shapes shown in FIG. 1, circle 102-A has the highest drag coefficient and shape 110-A has the lowest drag coefficient. Although shape 112-A is a flat plate and has a lower coefficient than shape 110-A, it is included for reference purposes only because its extremely thin shape limits it from being used for most practical purposes. Ellipses 104-A and 106-A have lower drag coefficients. As understood by comparing the widths of ellipses 104-A and 106-A, the drag coefficient for ellipses 104-A and 106-A decreases as the ratio of width-to-length decreases. Shapes 108-A and 110-A are streamlined airfoil shapes with even smaller width-to-length ratios. As can be seen, both airfoil 108-A and airfoil 110-A have significantly lower drag coefficients than circle 102-A and ellipses 104-A and 106-A. Airfoils 108-A and 110-A are representative of National Advisory Committee for Aeronautics (NACA) 0018 and NACA 0009 airfoil shapes. Therefore, it would be advantageous to develop buoys with a streamlined airfoil shape since this would reduce drag and consequently conserve power.

Unfortunately, a streamlined airfoil shape, with similar weight and displacement of a typical cylindrical sonobuoy, will not fit in a launch tube with a diameter of 6 inches to 8 inches. If the length D of the airfoil is reduced to fit within the diameter of the launch tube, the width or thickness of the airfoil will also be significantly reduced to preserve the correct shape. If airfoil 108-A has a length D equal to 6 inches, the maximum width of airfoil 108-A would be a mere 1.08 inches. The prohibitively small area in such an airfoil would render the airfoil useless for all practical purposes due to the lack of area for necessary electronic and mechanical components. Additionally, the buoy must be capable of being launched from up to 30,000 feet and such a small size could cause it to be blown far off course.

Embodiments of the present invention, however, enable a buoy with a streamlined airfoil shape to fit into existing launch tubes, which have a diameter between 6 inches to 8 inches, while still being of sufficient size to house necessary electronic and mechanical components. Additionally, it can be launched from aircraft at 30,000 feet or from submarines and surface ships. Therefore, embodiments of the present invention enable station-keeping buoys to station-keep for extended periods of time. In some embodiments, the station-keeping buoys are enabled to station-keep for periods of up to 30 days. Additionally, embodiments of the present invention require few to no adjustments for launch tubes to accommodate buoys made according to embodiments of the present invention which saves both time and money.

Figure 2:
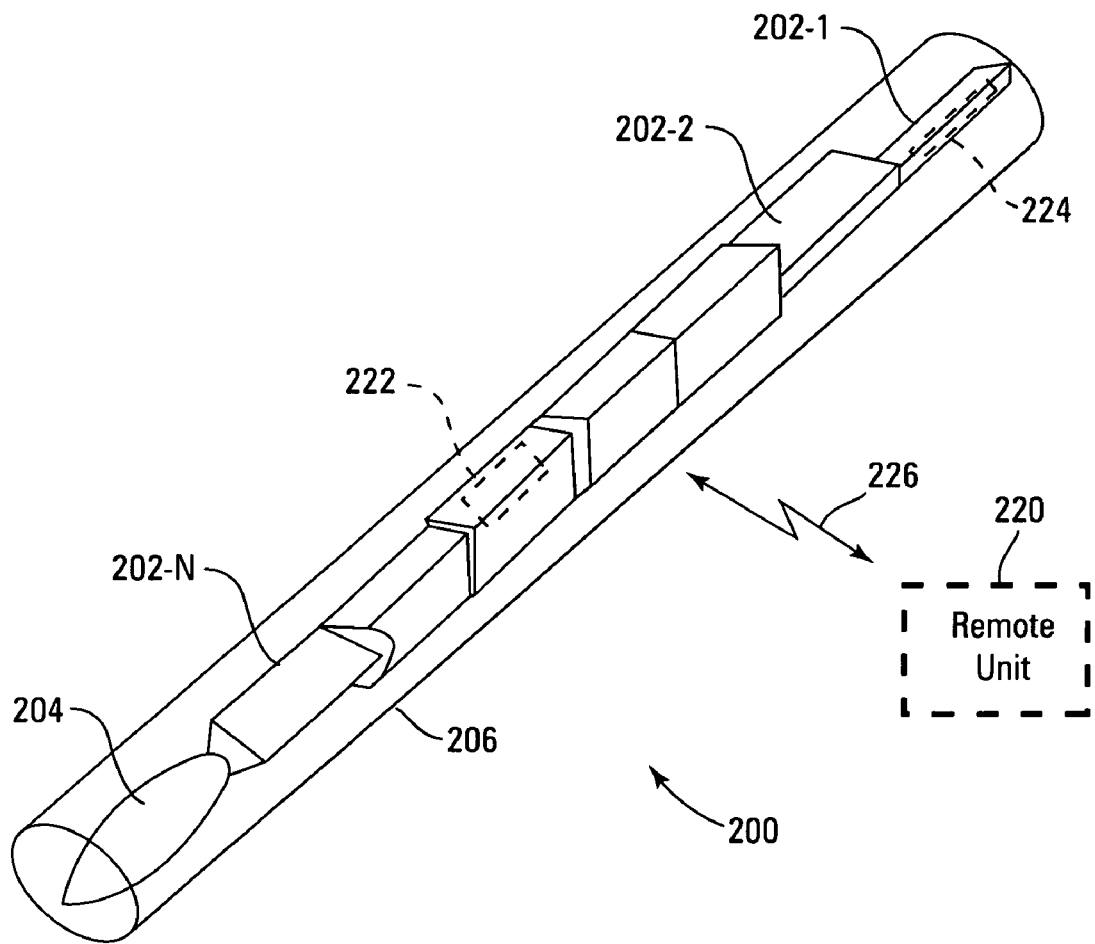
FIG. 2 is an image of an articulating buoy in a stowed configuration according to one embodiment of the present invention.

FIG. 2 is an image of an articulating buoy 200 in a stowed configuration according to one embodiment of the present invention. The term articulating refers to the fact that buoy 200 is composed of individual sections flexibly connected. Buoy 200 is composed of multiple sections 202-1 . . . 202-N and section 204. In one embodiment, buoy 200 is composed of 8 sections. Each of sections 202-1 . . . 202-N and section 204 are water-tight sealed preventing water from entering the sections. In one embodiment, section 204 houses a battery compartment. In other embodiments section 204 is used to house other electronic components. In some embodiments, one or more of sections 202-1 . . . 202-N house other components, such as a navigation and control unit, a propulsion system, a radio transmitter, sonar equipment, etc. Additionally, in some embodiments, one or more of sections 202-1 . . . 202-N do not house any components but are used primarily to support floatation and maintain stability of the buoy through means known to one of skill in the art, such as water ballast to support stabilization or air pockets to support floatation. In an embodiment using water ballast each of sections 202-1 . . . 202-N and 204 is individually sealed and any electrical components housed within a section are also water-tight sealed such that only a portion of each section is able to take in water for the water ballast and electronic components are not exposed to water. In all embodiments, buoy 200 is properly weighted to maintain buoy 200 afloat and stable. Sections 202-1 . . . 202-N and section 204 are connected to adjacent sections through joint means (shown in FIG. 3). In one embodiment, the joint means comprise pivot hinges. In other embodiments, other appropriate joint means are used.

Buoy 200 is referred to as station-keeping because it can maintain itself in a particular geographic location or station. In some embodiments, one of sections 202 comprises a navigation and control unit 222 that utilizes Global Positioning System (GPS) technology. Additionally, in some embodiments, one of sections 202 comprises a propulsion system 224 which functions in conjunction with a navigation and control 222 unit to maintain buoy 200 in a particular geographic location. In one embodiment, this location is fixed and determined prior to launch. In other embodiments, the location is changeable remotely. For example, in some embodiments, a user operates a remote unit 220 to transmit signals to buoy 200 via wireless link 226 in order to control the location. In yet other embodiments, the geographic location is determined according to the location of impact with the water surface. A propeller based propulsion system is used in one embodiment to maintain the geographic location. In other embodiments, a jet propulsion system is used.

In some embodiments, sleeve 206 is an integral part of buoy 200 used to house buoy 200. In other embodiments, sleeve 206 is not used and is not a part of buoy 200. Sleeve 206 facilitates storing, transporting and launching buoy 200. In one embodiment, buoy 200 is removed from sleeve 206 prior to launch. In other embodiments, buoy 200 is launched while inside sleeve 206. In such embodiments, sleeve 206 is removed after launch. In one embodiment, sleeve 206 is removed through remote control via remote unit 220. In other embodiments, sleeve 206 is designed to open and release buoy 200 automatically upon occurrence of a particular event, such as impact with the water surface. Sleeve 206 and buoy 200 are made from any appropriate metal, metal alloy, plastic, foam or other appropriate material.

Figure 3:
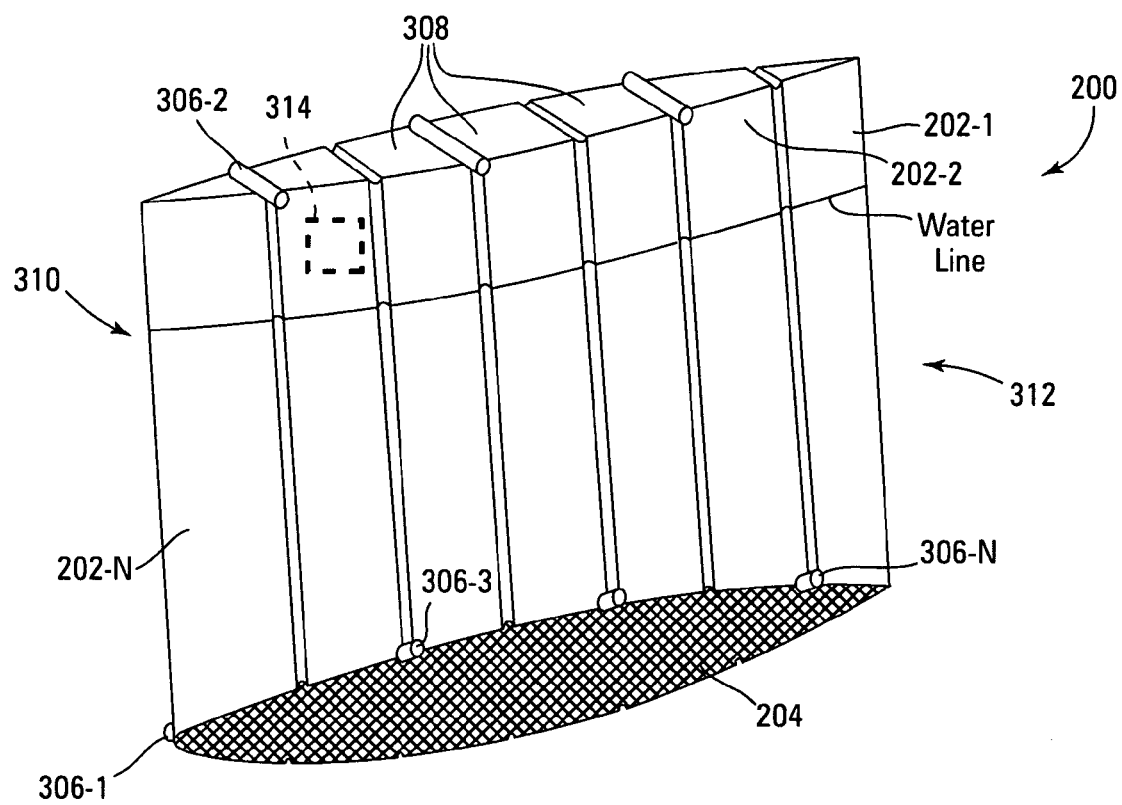
FIG. 3 is an image of an articulating buoy in a deployed configuration according to one embodiment of the present invention.

FIG. 3 is an image of an articulating buoy in a deployed configuration according to one embodiment of the present invention. Once deployed, sections 202-1 . . . 202-N and section 204 fold to form an articulating buoy as depicted in FIG. 3. Each of sections 202-1 . . . 202-N and 204 folds about one of joints 306-1 . . . 306-N. In one embodiment, sections 202-1 . . . 202-N fold in a fashion similar to the manner in which a Jacob's Ladder is folded together. In one embodiment, section 204 is folded underneath sections 202-1 . . . 202-N maintaining the streamlined shape. As can be seen more clearly in FIG. 3, sections 202-1 . . . 202-N and section 204 do not all have the same shape. Instead, each of sections 202-1 . . . 202-N and 204 is a cross-sectional piece of a streamlined shape such that when sections 202-1 . . . 202-N and 204 are rotated about joints 306-1 . . . 306-N sections 202-1 . . . 202-N and 204 are aligned to form a streamlined shape. In the embodiment in FIG. 3, a streamlined airfoil shape is used. The airfoil shape is not limited to a particular National Advisory Committee for Aeronautics (NACA) series airfoil shape. Embodiments of the present invention are compatible with any appropriate NACA series. In some embodiments a NACA 0015 shape is used. NACA 0015 is a symmetrical shape. In other embodiments, other symmetrical airfoil shapes are used. Symmetrical airfoil shapes are typically less subject to drift than asymmetrical or chambered shapes. However, in other embodiments a chambered airfoil shape is used. In other embodiments a NACA 67-015 laminar airfoil shape is used. In other embodiments, a NACA 67-018 laminar airfoil shape is used. In particular, in one embodiment, buoy 200 has a 30 inch chord length, 24 inch span and 5.4 inch maximum thickness. Additionally, in other embodiments, other streamlined shapes not including any NACA series airfoil shape are used.

For illustrative purposes only, gaps between each of sections 202-1 . . . 202-N are displayed in FIG. 3. In practice, each of sections 202-1 . . . 202-N and 204 will be flush against adjacent sections when in a deployed configuration. Additionally, for illustrative purposes only, joints 306-1 . . . 306-N have been drawn as protruding out from sections 202-1 . . . 202-N and 204. In practice, joints 306-1 . . . 306-N are integrated into sections 202-1 . . . 202-N and 204 such that joints 306-1 . . . 306-N are flush with the surface of sections 204 and 202-1 . . . 202-N leaving no substantial gap between sections 202-1 . . . 202-N and 204.

In a folded, deployed configuration, front portion 310 of buoy 200 is maintained facing the direction of current flow. This is achieved through a propulsion system, navigation and control unit and various sensors as known to one of skill in the art. Each of these components is housed in at least one of sections 202-1 . . . 202-N and 204. In one embodiment, a propulsion system is located in a section in a rear portion 312 of buoy 200. In one such embodiment, section 202-1 houses the propulsion system. In another such embodiment, other rear sections house the propulsion system. In other embodiments, more than one section may house a propulsion system As depicted in FIG. 3, in some embodiments, a portion of buoy 200 is maintained above the water surface level. In one embodiment, the draft is 18 inches. Also, in one embodiment, flat surface area 308 of one or more sections 202-1 . . . 202-N is equipped with solar cell paneling used to collect energy and recharge a battery.

Various means are employed in different embodiments to fold buoy 200 such that buoy 200 self-aligns into at least two configurations, a stowed configuration and a deployed configuration. In some embodiments, joints 306-1 . . . 306-N include stored energy hinges biased to a deployed configuration such that once external forces which maintain buoy 200 in a stowed configuration are removed, buoy 200 automatically folds into a deployed configuration. In one such embodiment, an external force used to maintain buoy 200 in a stowed configuration is provided by sleeve 206. Once buoy 200 is removed from sleeve 206, in such an embodiment, buoy 200 will automatically fold into a deployed configuration due to the bias in joints 306-1 . . . 306-N. In another embodiment, locking pins are used to maintain buoy 200 in a stowed configuration. Once the locking pins are removed in such an embodiment, buoy 200 folds to a deployed configuration due to the bias in the joints.

In other embodiments, joints 306-1 . . . 306-N are mechanically powered by a motor 314 such that a force acts on joints 306-1 . . . 306-N and sections 202-1 . . . 202-N to cause buoy 200 to fold into a deployed configuration with each of sections 202-1 . . . 202-N and 204 folding about one or more of joints 306-1 . . . 306-N. In one such embodiment, the mechanically powered joints are activated and controlled remotely. In another such embodiment, the mechanically powered joints are activated automatically by occurrence of a particular event, such as impact with the water surface. In yet other embodiments, each of sections 202-1 . . . 202-N and 204 are weighted such that the natural alignment of heavier portions sinking below the water surface and lighter portions rising to the water surface causes buoy 200 to fold into the streamlined deployed configuration. In yet other embodiments, other appropriate means are used for folding buoy 200 into a deployed configuration.

Buoy 200 has various advantages over prior buoys. In a stowed configuration, buoy 200 is capable of being launched from existing launch tubes. In some embodiments, the diameter of buoy 200 in a stowed configuration is 6 inches and the length is 163 inches, enabling buoy 200 to be launched from existing launch tubes in aircraft and submarines which have a diameter of 6 inches to 8 inches. Additionally, in one such embodiment, buoy 200 weighs 100 pounds which gives buoy 200 the capability of being launched by just one person. In other embodiments, buoy 200 is larger with a 21 inch diameter enabling it to be launched from existing torpedo tubes which have a diameter of 21 inches or more.

In a deployed configuration, buoy 200 is optimized for drag reduction by using a streamlined shape. By reducing drag, buoy 200 consumes less power as a station-keeping buoy through a propulsion system. In turn, by consuming less power, buoy 200 has a longer station-keeping duration than typical station-keeping buoys. In one embodiment, buoy 200 can station-keep for 30 days. Thus, through the combination of a streamlined deployed configuration and a cylindrical stowed configuration, embodiments of the present invention provide a much needed solution to the problem of providing a buoy which reduces power consumption through a more efficient shape and yet can still be launched from existing launch tubes which have a diameter ranging from approximately 6 inches to approximately 21 inches.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An articulating sonobuoy, comprising:
a plurality of sections; and
a plurality of joints connecting each of the plurality of sections to adjacent sections;
wherein, each of the plurality of sections self-aligns by rotating about one or more of said plurality of joints changing the shape of the buoy from a stowed configuration to a streamlined deployed configuration.

2. The articulating sonobuoy of claim 1, wherein:
the buoy weighs approximately 100 pounds.

3. The articulating buoy of claim 1, wherein:
at least one of the plurality of sections is a power source housing which folds under the remaining plurality of buoy sections.

4. The articulating buoy of claim 1, wherein:
at least one of the plurality of sections is a propulsion system housing, wherein a propulsion system in the propulsion system housing is one of a jet propulsion system, and a propeller based system.

5. The articulating buoy of claim 1, further comprising:
a sleeve for housing the buoy in a stored configuration.

6. The articulating sonobuoy of claim 1, wherein the stowed configuration is a cylindrical.

7. The articulating sonobuoy of claim 6, wherein:
the stowed cylindrical configuration has a diameter between approximately 6 inches and approximately 21 inches.

8. The articulating sonobuoy of claim 6, wherein:
the stowed cylindrical configuration has a length of approximately 163 inches.

9. The articulating sonobuoy of claim 1, wherein:
the streamlined deployed configuration is an airfoil shape.

10. The articulating sonobuoy of claim 9, wherein the airfoil shape is one of:
a symmetric airfoil shape; and
a chambered airfoil shape.

11. The articulating buoy of claim 9, wherein:
the airfoil shape is one of an NACA 67-018 laminar airfoil, an NACA 0015, and an NACA 67-015.

12. The articulating buoy of claim 9, wherein:
the airfoil has a chord length of 30 inches, maximum thickness of 5 inches and a span of 24 inches.

13. An articulating sonobuoy, comprising:
a plurality of sections;
joint means for connecting said plurality of sections to adjacent sections; and
folding means for folding said plurality of sections about said
joint means such that the buoy has at least two configurations, wherein the at least two configurations include an initial stowed configuration and a deployed configuration; and
a means for maintaining the buoy in a specified geographic location, wherein the means for maintaining the buoy in a specified geographic location comprises:
a propulsion system housed in at least one of the plurality of sections, and
a navigation and control unit housed in at least one of the plurality of sections, the navigation and control unit controlling the propulsion system.

14. The articulating sonobuoy of claim 13, wherein the folding means comprises one of:
a plurality of stored energy hinges biased to the deployed configuration and maintained in a stowed configuration by an external force;
a motor connected to said plurality of sections and joint means, the motor being used to mechanically move said plurality of sections about said plurality of joints; and
weighted portions of the plurality of sections such that the sinking of heavier portions and rising of lighter portions causes the sonobuoy to fold into the streamlined deployed configuration.

15. An articulating sonobuoy comprising:
a plurality of sections, each section being a cross-sectional piece of a streamlined airfoil shape; and
a plurality of joints connecting each of the plurality of sections to adjacent sections, wherein rotation of each of the plurality of sections about the plurality of joints changes the shape of the buoy from a cylindrical stowed configuration with a diameter between approximately 6 inches and 21 inches to a streamlined airfoil deployed configuration.

16. A method of deploying a streamlined sonobuoy through cylindrical launch tubes, the method comprising:
aligning a plurality of sections to fit within a cylindrical launch tube, wherein each of the plurality of sections is a cross-sectional piece of a streamlined shape;
releasing the aligned plurality of sections through the cylindrical launch tube; and
rotating each of the plurality of sections about one or more joints, wherein rotation of the plurality of sections aligns the plurality of sections to form a streamlined shape.

17. The method of claim 16, wherein aligning a plurality of sections to fit within a cylindrical launch tube comprises aligning a plurality of sections to fit within a cylindrical launch tube with a diameter between approximately 6 inches and 21 inches.

18. The method of claim 16, further comprising;
maintaining the stability of the sonobuoy in the streamlined shape through use of water ballast.

\* \* \* \* \*

UNITED STATES PATENT AND TRADEMARK OFFICE
CERTIFICATE OF CORRECTION

| | |
|---|---|
| PATENT NO. | : 7,390,233 B2 |
| APPLICATION NO. | : 11/371542 |
| DATED | : June 24, 2008 |
| INVENTOR(S) | : Schmitz Sr. |

Page 1 of 1

It is certified that error appears in the above-identified patent and that said Letters Patent is hereby corrected as shown below:

Title Pg, Item (73) Assignee: please replace "Manassas, VA" with --Bethesda, MD--

Signed and Sealed this

Twenty-fourth Day of March, 2009

JOHN DOLL
*Acting Director of the United States Patent and Trademark Office*